Dec. 9, 1941.  N. M. JOHNSON  2,265,171
INTERNAL COMBUSTION ENGINE
Filed March 13, 1939   3 Sheets-Sheet 1
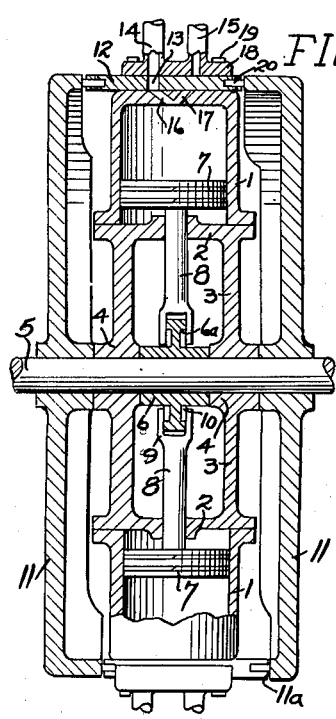
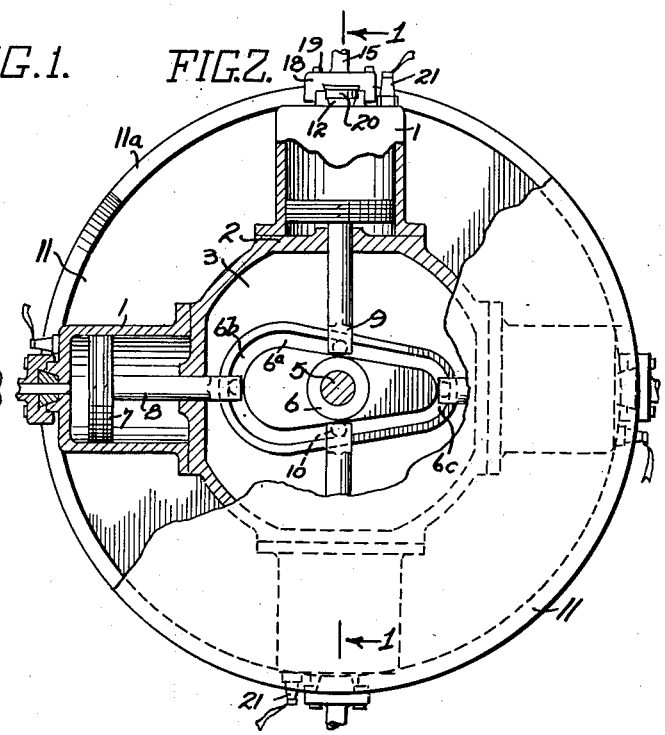
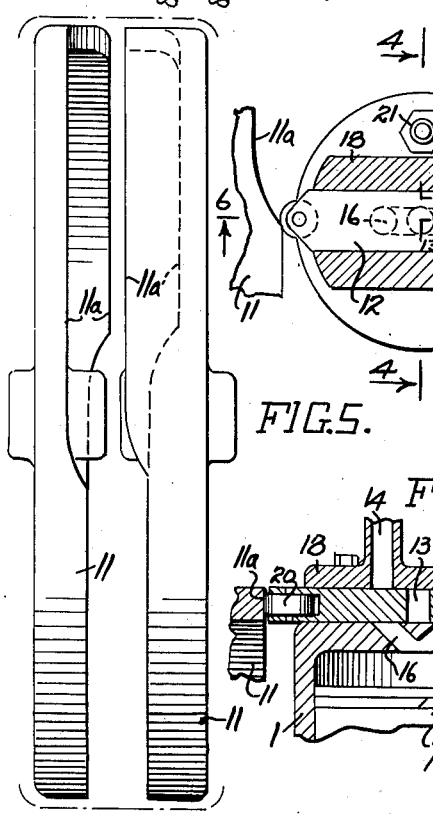
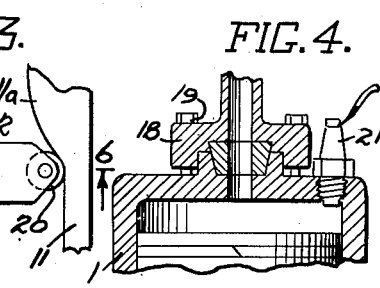
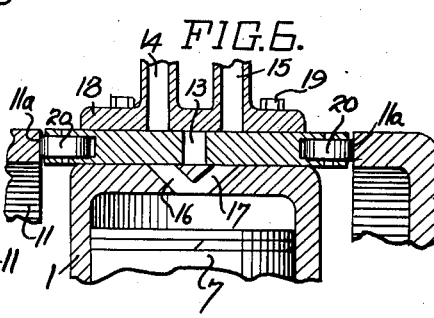
INVENTOR
Noble M. Johnson
BY
ATTORNEY INVENTOR
Noble M. Johnson
BY
ATTORNEY

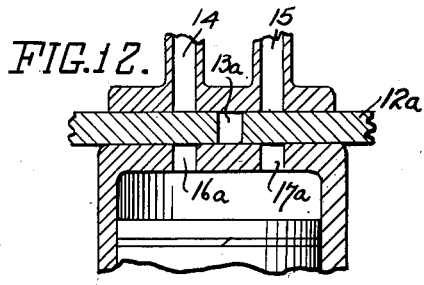
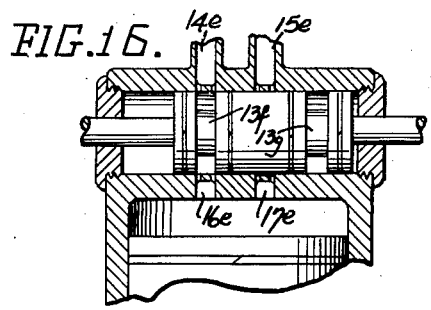
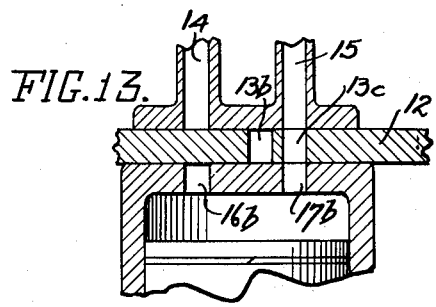
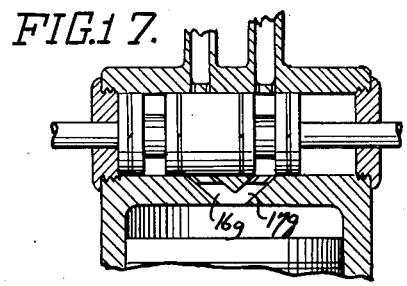
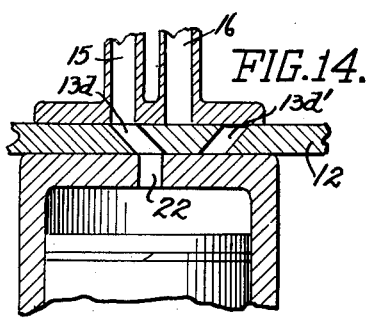
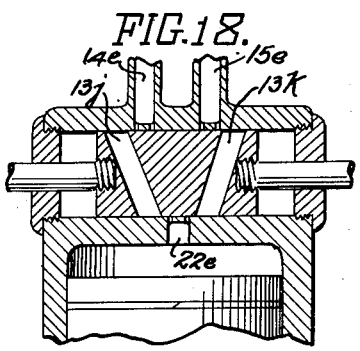
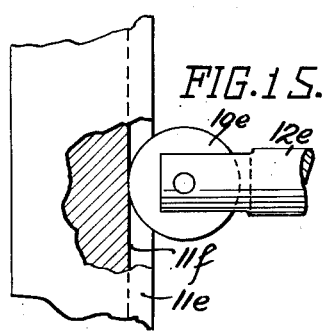

Patented Dec. 9, 1941

2,265,171

UNITED STATES PATENT OFFICE 2,265,171

INTERNAL COMBUSTION ENGINE

Noble M. Johnson, Detroit, Mich., assignor to Twin Cam Motor Corporation, Detroit, Mich., a company of Michigan Application March 13, 1939, Serial No. 261,413

2 Claims. (Cl. 123—90)

This invention relates to improvements in internal combustion engines, broadly speaking of the type shown and described in my United States Patent No. 1,735,764, wherein the cylinders are substantially radially arranged, and the piston rods coact with a cam mounted upon the drive shaft upon which valve cams are also provided for actuating the valves.

It is an object of this invention to provide such an internal combustion engine wherein the valve are reciprocated in contact with the cylinders and both extremities of the valves are in constant contact with the valve operating cams.

Another object of the invention is to provide such an engine with a valve mechanism wherein a valve is mounted for transverse reciprocation across each cylinder to contact both the inlet and exhaust, and two cams mounted on the driving shaft are in constant contact with opposite extremities of all the valves at all times.

A further object of the invention is to provide an internal combustion engine wherein all the piston rods actuate a common driving cam having two substantially semi-circular extremities of unequal radii, and the adjacent ends of the curved extremities are connected along a substantially straight path.

Having thus briefly and broadly stated some of the objects and advantages of the invention I will now proceed to describe my invention in detail with the aid of the accompanying drawings, in which:

Figure 1 illustrates a sectional view of the invention taken on the line 1—1 of Figure 2.

Figure 2 is a side elevation, partly in section.

Figure 3 is a view, partly in section, showing the outer extremity of one cylinder and portions of the valve cams.

Figure 4 is a section on the line 4—4 of Figure 3.

Figure 5 is a side view of the two valve cams.

Figure 6 is a section on the line 6—6 of Figure 3, but showing the valve in mid position.

Figure 7 is an enlarged detail showing a portion of the drive shaft, and the driving cam thereon.

Figures 12, 13 and 14 are sectional views of portions of cylinders showing slightly modified valve port arrangements.

Figure 15 is an enlarged detail showing one extremity of a valve in contact with a valve cam as shown in Figure 8.

Figures 16, 17 and 18 are sectional view of portions of cylinders showing other slightly varied valve port arrangements.

Figure 8:
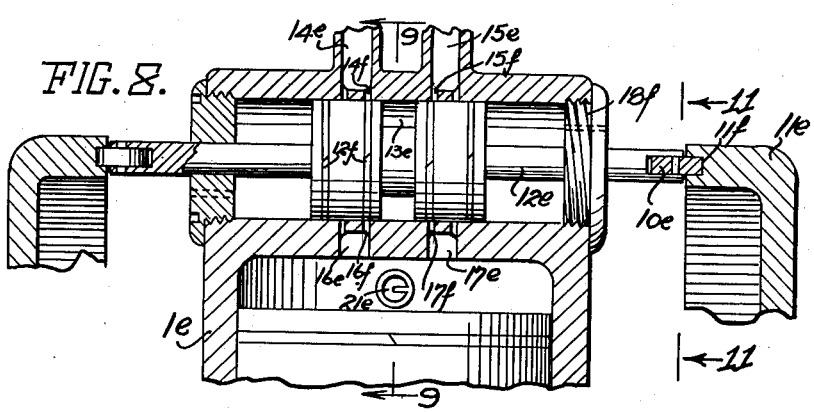
Figure 8 is a cross sectional view showing a portion of one cylinder and a modified valve arrangement.

Referring to Figures 1 to 7 of the drawings, 1 designates a plurality of substantially radially disposed cylinders the inner covers 2 of which are integral with a stationary casing 3 in which bearings 4 are provided for a drive shaft 5. Fixed on the latter between the bearings 4 is a cam 6 having grooves 6a formed in opposite sides thereof and uniformly spaced from the cam periphery. The cam 6 is elongated and has two substantially semi-circular extremities 6b and 6c, the radius of the extremity 6b being considerably longer than the radius of the extremity 6c. Mounted in each cylinder 1 is a piston 7 having a piston rod 8 which projects through its cylinder cover 2 and terminates in a bifurcated extremity 9 in which rollers 10 are mounted which rotate in the opposed cam grooves 6a, so that reciprocation of the piston 7 causes rotation of the driving cam 6 and its shaft 5.

Mounted upon the shaft 5 are two valve cams 11 having opposed annular cam faces 11a formed around their peripheries. Mounted for reciprocation across the outer extremity of each cylinder is a valve 12 having at least one port 13 formed therethrough to selectively connect the valve housing ports 14 and 15 with the cylinder ports 16 and 17 respectively. The valve housings 18 are suitably mounted upon the outer cylinder heads as by screws 19 in engagement with the latter. The valves 12 are preferably provided with rollers 20 at their extremities each of which rides continuously upon one of the cam faces 11a, as the cams are turned in timed relation with the movement of the pistons 7. 21 denotes spark plugs which are shown extending through the heads of the cylinders 1.

From the foregoing it will be readily seen that reciprocation of the pistons 7 causes rotation of the shaft 5 through the driving cam 6, and that the valve cams 11, both of which are in constant contact with one extremity of each valve 12, reciprocate the latter so that combustible mixture from the housing inlet ports 14 enters the cylinder inlet ports 16 and products of combustion from the cylinder exhaust port 17 pass through the housing exhaust ports 15 at predetermined times.

Figures 12, 13 and 14 show slightly modified valve porting arrangements. In Figure 12 the valve 12a is again provided with a single port 13a which, by movement of the said valve, is brought into registry with the housing inlet port 14 and the cylinder inlet port 16a, or with the housing exhaust port 15 and the cylinder exhaust port 17a. In this instance the ports 16a and 17a are parallel with the ports 14 and 15 instead of being inclined towards one another and terminating in a common orifice in the head of the cylinder 1, as shown in Figure 6.

In Figure 13 the valve 12 is provided with two parallel ports 13b and 13c, the former being adapted to register with the ports 14 and 16b, and the latter with the ports 15 and 17b. In Figure 14 the cylinder head is provided with a single port 22 which is adapted to be connected with either the housing inlet port 15 or the housing exhaust port 16 by means of inclined ports 13d and 13d' respectively formed through the valve 12.

Figure 9:
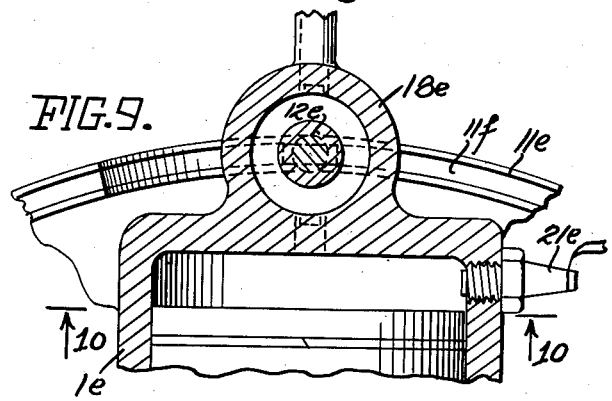
Figure 9 is a section on the line 9—9 of Figure 8.
Figure 11:
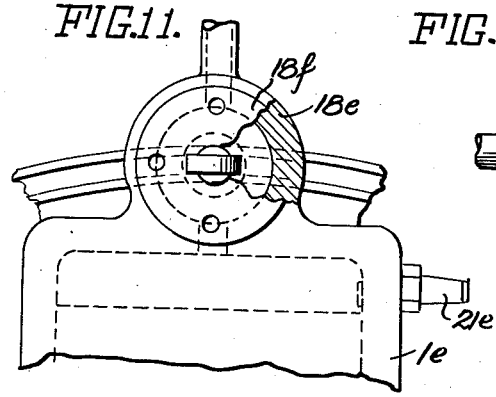
Figure 11 is a side elevation of the outer portion of one cylinder with one valve cam removed, taken on the line 11—11 of Figure 8.
Figure 10:
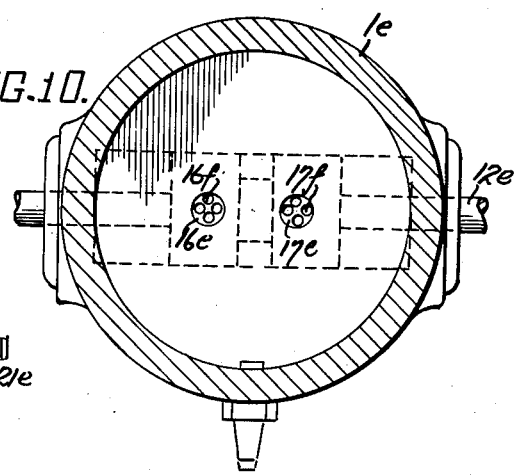
Figure 10 is a section on the line 10—10 of Figure 9.

In the modified arrangement shown in Figures 8 to 11 inclusive and Figure 15 a somewhat varied arrangement is shown. Formed integral with the cylinders 1e and extending transversely across the outer cylinder heads are circular valve housings 18e provided at opposite extremities with apertured covers 18f which serve as guides for the valves 12e, which in this case are in the form of piston valves and are provided within the housing with at least one annular groove 13e. Around the valves 12e piston rings 12f may be provided in order to prevent leakage of gas outwardly from the annular groove, or grooves, 13e. Opening into each housing 18e is an inlet and an exhaust port 14e and 15e each of which is adapted to be connected to the cylinder inlet and exhaust port 16e and 17e respectively. In order to prevent the piston rings 12f catching in the ports 14e, 15e, 16e, and 17e small apertures are formed from these ports and open into the bore of the housing; these apertures shown at 14f, 15f, 16f and 17f are so small that danger of the piston rings 12f being caught and damaged thereby is eliminated.

The spark plugs 21e are shown extending laterally through the cylinders 1e, and annular grooves 11f are formed in the valve cams 11e to receive the rollers 10e which are rotatably mounted on the extremities of the valves 12e.

In Figures 16, 17 and 18 slightly varied porting arrangements of this construction are shown.

In Figure 16 the housing inlet and exhaust ports 14e and 15e are adapted to be connected to the cylinder inlet and exhaust ports 16e and 17e by annular inlet grooves or ports 13f and 13g respectively. In Figure 17 the cylinder inlet and exhaust ports 16g and 17g extend laterally in opposite directions from a common opening in the inner face of the head of the cylinder 1; and in Figure 18 a single port 22e is provided through the head of the cylinder which is adapted to be connected by one of the valve ports 13j or 13k with the housing inlet or exhaust port 14e or 15e respectively.

Referring again to the driving cam 6, it will be noted that a smooth working engine is obtained by arranging the firing as the rollers 10 pass around the smaller cam groove radius 11c, and exhausting as they travel around the larger radius 11b. Moreover the form of the cam 6 and its grooves 6a herein shown wherein the cam paths between the adjacent ends of the radii 6b and 6c are substantially straight not only result in high operating efficiency but is also simple to manufacture.

While in the foregoing the preferred embodiments of the invention have been described and shown, it is understood that further alterations and modifications may be made thereto provided the said alterations and modifications fall within the scope of the appended claims.

What I claim as my invention and desire to secure by Letters Patent is:

1. In an internal combustion engine including a plurality of cylinders having ports formed through their outer extremities, pistons in said cylinders, a drive shaft, and means coacting with each piston for rotating the latter, the combination of a housing secured to the outer extremity of each cylinder, a valve mounted for reciprocation in each housing parallel with the drive shaft axis, inlet and outlet ports in said housings adapted to be connected to the ports in their respective cylinders by said valves, two cams secured to the drive shaft one on each side of the cylinders, said cams having opposed and inwardly directed annular cam faces, and all of said valves being constantly held between and supported by both said cam faces whereby the valves are actuated in timed relation with the drive shaft rotation.

2. In an internal combustion engine, the combination set forth in claim 1, wherein a roller is mounted on each extremity of each valve for rotation upon the adjacent cam face.

NOBLE M. JOHNSON.